US011313176B2

(12) United States Patent
Griffo et al.

(10) Patent No.: US 11,313,176 B2
(45) Date of Patent: Apr. 26, 2022

(54) METAL MATRIX COMPOSITE MATERIAL FOR ADDITIVE MANUFACTURING OF DOWNHOLE TOOLS

(71) Applicant: Smith International, Inc., Houston, TX (US)

(72) Inventors: Anthony Griffo, The Woodlands, TX (US); Madapusi K. Keshavan, Oceanside, CA (US); Youhe Zhang, Spring, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 98 days.

(21) Appl. No.: 16/175,920

(22) Filed: Oct. 31, 2018

(65) Prior Publication Data

US 2019/0128072 A1 May 2, 2019

Related U.S. Application Data

(60) Provisional application No. 62/737,508, filed on Sep. 27, 2018, provisional application No. 62/579,621, filed on Oct. 31, 2017.

(51) Int. Cl.
*E21B 10/54* (2006.01)
*E21B 10/32* (2006.01)
(Continued)

(52) U.S. Cl.
CPC ............. *E21B 10/54* (2013.01); *E21B 10/32* (2013.01); *E21B 10/42* (2013.01); *E21B 29/005* (2013.01);
(Continued)

(58) Field of Classification Search
CPC .......... E21B 10/54; E21B 10/32; E21B 10/42; E21B 29/005; B33Y 80/00; B33Y 70/00;
(Continued)

(56) References Cited

U.S. PATENT DOCUMENTS 4,723,996 A 2/1988 Brunet et al.
5,089,182 A 2/1992 Findeisen et al.
(Continued)

FOREIGN PATENT DOCUMENTS

CN 101198762 A 6/2008
CN 101595233 A 12/2009
(Continued)

OTHER PUBLICATIONS

Deng et al., Toughness Measurement of Cemented Carbide with Chevron-Notched Three-Point Bend Test, Advanced Engineering Materials, 2010, 12(9), pp. 948-952.
(Continued)

*Primary Examiner* — Nicole Coy

(57) ABSTRACT

A downhole cutting tool includes a tool body with a cutting element or cutting element pocket thereon. At least a portion of the tool body or an attachment thereto is a metal matrix composite formed from metal carbide particles dispersed in a continuous metal matrix. The metal carbide particles make up less than 45 wt % of the metal matrix composite and/or less than 30 vol % of the metal matrix composite. The continuous metal matrix may also be formed from a metal or metal alloy other than Ni—Si—B and/or have a transverse rupture strength greater than 150 ksi and a fracture toughness over 22 ksi*$in^{0.5}$.

23 Claims, 6 Drawing Sheets

(51) Int. Cl.
*E21B 29/00* (2006.01)
*E21B 10/42* (2006.01)
*B33Y 70/00* (2020.01)
*B33Y 80/00* (2015.01)
*C22C 32/00* (2006.01)
*B23K 103/18* (2006.01)
*B33Y 10/00* (2015.01)
*B23K 101/00* (2006.01)
*B23K 15/00* (2006.01)
*B22F 5/00* (2006.01)

(52) U.S. Cl.
CPC ..... *B22F 2005/001* (2013.01); *B23K 15/0086* (2013.01); *B23K 2101/002* (2018.08); *B23K 2103/18* (2018.08); *B33Y 10/00* (2014.12); *B33Y 70/00* (2014.12); *B33Y 80/00* (2014.12); *C22C 32/0052* (2013.01)

(58) Field of Classification Search
CPC . B33Y 10/00; C22C 32/0052; B23K 15/0086; B23K 2103/18; B23K 2101/002; B22F 2005/001
See application file for complete search history.

(56) References Cited

U.S. PATENT DOCUMENTS

| | | | |
|---|---|---|---|
| 7,475,743 | B2 | 1/2009 | Liang et al. |
| 7,562,692 | B2 * | 7/2009 | Fortin ............... C22C 1/026 164/97 |
| 8,025,112 | B2 | 9/2011 | Mirchandani et al. |
| 8,225,886 | B2 | 7/2012 | Mirchandani et al. |
| 8,459,380 | B2 | 6/2013 | Mirchandani et al. |
| 8,858,870 | B2 | 10/2014 | Mirchandani et al. |
| 9,393,674 | B2 * | 7/2016 | Keshavan ........ B24D 18/0009 |
| 9,464,486 | B2 | 10/2016 | Zhang et al. |
| 10,029,301 | B2 | 7/2018 | Cook, III et al. |
| 10,941,619 | B2 | 3/2021 | Xu et al. |
| 2008/0101977 | A1 | 5/2008 | Eason et al. |
| 2010/0276208 | A1 | 11/2010 | Sue |
| 2011/0005837 | A1 * | 1/2011 | Hoffmaster ........ E21B 10/567 175/57 |
| 2014/0098728 | A1 | 4/2014 | Brown et al. |
| 2016/0083304 | A1 | 3/2016 | Mironets et al. |
| 2018/0038167 | A1 | 2/2018 | Xu et al. |
| 2019/0024215 | A1 * | 1/2019 | Yahata ................ B22D 23/06 |
| 2019/0071931 | A1 * | 3/2019 | Wang .................. C22C 29/08 |

FOREIGN PATENT DOCUMENTS

| | | |
|---|---|---|
| CN | 104195550 A | 12/2014 |
| CN | 104388875 A | 3/2015 |
| CN | 104388884 A | 3/2015 |
| CN | 104765385 A | 7/2015 |
| CN | 107400816 A | 11/2017 |
| CN | 106756240 B | 7/2018 |
| DE | 102016121531 A1 | 5/2018 |
| RU | 2305024 C2 | 8/2007 |
| WO | 2017096748 A1 | 6/2017 |

OTHER PUBLICATIONS

Sutton et al., Powders for Additive Manufacturing Processes: Characterization Techniques and Effects on Part Properties, Solid Freeform Fabrication 2016, pp. 1004-1030.
First Chinese Office Action issued in Chinese patent application 2018112851239 dated Jul. 5, 2021, 24 pages with English translation.
Second Office Action issued in Chinese patent application 201811285123.9 dated Jan. 25, 2022, 22 pages with English translation.

* cited by examiner

METAL MATRIX COMPOSITE MATERIAL FOR ADDITIVE MANUFACTURING OF DOWNHOLE TOOLS

CROSS-REFERENCE TO RELATED APPLICATIONS

This application claims the benefit of U.S. Patent Application No. 62/579,621, filed Oct. 31, 2017, and U.S. Patent Application No. 62/737,508, filed Sep. 27, 2018, each of which is expressly incorporated herein by this reference in its entirety.

BACKGROUND

Polycrystalline diamond compact ("PDC") cutters are known in the art for use in earth-boring drill bits. Typically, bits using PDC cutters include an integral bit body which may be made of steel or fabricated from a hard, composite matrix material composed of tungsten carbide and a metal binder. PDC cutters are mounted along the exterior face of blades of the bit body. Each PDC cutter has a portion which is brazed in a recess or pocket formed in the blade.

The PDC cutters are positioned along the leading edges of the bit body blades so that as the bit body is rotated, the PDC cutters engage and drill the earth formation. In use, high forces may be exerted on the PDC cutters. Additionally, the bit and the PDC cutters may be subjected to substantial abrasive forces. In some instances, impact, vibration, and erosive forces have caused drill bit failure due to loss of one or more cutters, or due to breakage of the blades.

While steel body bits may have toughness and ductility properties which make them resistant to cracking and failure due to impact forces generated during drilling, steel is more susceptible than matrix material to abrasive and erosive wear caused by high-velocity drilling fluids and abrasive particles. The abrasive particles may include portions of the formation carried by drilling fluids, as well as sand, rock cuttings, and the like. Generally, portions of steel body PDC bits are coated with a more erosion-resistant material, such as tungsten carbide hardfacing, to improve erosion resistance. Tungsten carbide and other erosion-resistant hardfacing materials are, however, relatively brittle, and the hardfacing coverage is generally not very good close to the cutter pockets due to the presence of graphite plugs in the cutter pockets, or the close proximity of multiple cutters. During use, the fluids with abrasive particles potentially erode the body under the hardfacing, and near the cutter pockets, which can lead to the hardfacing cracking, spalling, peeling off, or wearing, thereby further exposing the softer steel body, which can then erode. This can lead to loss of PDC cutters as the area around the cutter is eroded away. Other methods such as laser hardfacing are not very practical on finished bit, as this process is time consuming and costly.

Tungsten carbide (WC) hard metal matrix body bits have higher wear and erosion resistance as compared to steel bit bodies. A typical matrix bit used in the industry today is generally formed by packing a mold with tungsten carbide powder and then infiltrating the powder with a molten transition metal alloys. Common metal alloys for forming the metal matrix are iron, nickel, copper, or alloys thereof. The continuous metal matrix phase generally has a melting point lower than 1,200° C.

Bit bodies formed from tungsten carbide or other hard metal matrix materials, while more erosion resistant than steel, lack toughness and strength, thus making them brittle and prone to cracking when subjected to impact and fatigue forces encountered during drilling. This can result in one or more blades cracking or even breaking off the bit. The formation and propagation of cracks in the matrix body may result in the loss of one or more PDC cutters. A lost cutter may abrade against the bit, causing further accelerated bit damage. Bits formed without tungsten carbide may, however, have sufficient toughness and strength for particular applications, but may lack other properties, such as erosion resistance. Thus, previous efforts have instead relied on combinations of materials to achieve a balance of properties.

Additionally, matrix body drill bits have been manufactured to include wide particle size distributions. Having wide distributions within a bit have been relied upon to achieve a close packing of the carbide wear particles to increase wear resistance. In making a metal matrix bit with tungsten carbide and a metal binder using infiltration process, the relative amount of binder and carbide volume fraction also depends on the particle size and shape of tungsten carbide. The amount of binder in the composite depends on packing density.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some aspects, a downhole cutting tool includes a tool body that includes a cutting element or cutting element pocket thereon. At least a portion of the tool body includes a metal matrix composite formed from spherical cast carbide particles dispersed in a continuous metal matrix formed from a metal binder. In the downhole cutting tool, a density ratio of the spherical cast carbide particles to the metal binder is between 1.7 and 2.1 (or between 1.8 and 2.0), and the spherical cast carbide particles compose up to 27 vol % (e.g., up to 25 vol %) or up to 40 wt % of the metal matrix composite. The metal binder also makes up at least 75 vol % or at least 60 wt % of the metal matrix composite.

In some aspects, a downhole cutting tool includes a tool body having a cutting element or cutting element pocket thereon. At least a portion of the tool body includes a metal matrix composite formed from hard particles dispersed in a continuous metal matrix formed from a metal binder. In the metal matrix, a density ratio of the hard particles to the metal binder is between 1.7 and 2.1 (e.g., between 1.8 and 2.0) and the hard particles make up less than 60 vol % of the metal matrix composite, with the metal binder substantially making up the balance. The hard particles include sintered tungsten carbide. In some aspects, the hard particles consist essentially of spherical, sintered tungsten carbide. In additional aspects, the hard particles consist essentially of a mixture of sintered WC—Co and at least one of cast metal carbide or MCWC. In the same or other aspects, the sintered tungsten carbide includes stoichiometric tungsten carbide having a mean particle size less than 5 microns, while the sintered tungsten carbide has a mean size between 40 and 100 microns.

In additional aspects, a downhole cutting tool includes a tool body having a cutting element or cutting element pocket thereon. At least a portion of the tool body includes a metal matrix composite formed from hard particles dispersed in a continuous metal matrix formed from a metal binder. A density ratio of the hard particles and the metal binder is between 1.7 and 2.1 (or between 1.8 and 2.0), and the hard particles make up less than 60 vol % of the metal matrix composite, with the binder substantially making up the balance. Additionally, the hard particles include carburized WC in which the particle size is less than 10 microns, and where C makes up between 6 wt % and 8 wt % of the sintered WC—Co hard particles.

In some aspects, a downhole cutting tool includes a tool body with a cutting element or cutting element pocket thereon. At least a portion of the tool body is a metal matrix composite formed from hard particles dispersed in a continuous metal matrix. The metal matrix composite has a transverse rupture strength greater than 150 ksi, and a fracture toughness over 18 ksi*in$^{0.5}$, over 20 ksi*in$^{0.5}$, or over 22 ksi*in$^{0.5}$.

In some aspects, a downhole cutting tool includes a tool body having a cutting element or cutting element pocket. At least a portion of the tool body includes a metal matrix composite formed from hard particles dispersed in a continuous metal matrix formed from a metal binder. A density ratio of the hard particles to the metal binder is between 0.5 and 1.2 (e.g., between 0.6 and 1), and the hard particles make up less than 60 vol % of the metal matrix composite.

In some aspects, a downhole cutting tool includes a tool body having a cutting element or cutting element pocket. At least a portion of the tool body includes a metal matrix composite formed from hard particles dispersed in a continuous metal matrix formed from a metal binder. A density ratio of hard particles to the metal binder is between 0.9 and 1.1, and the hard particles make up less than 55 vol % or less than 40 wt % of the metal matrix composite. The hard particles can include a transition metal carbide or boride including SiC, TiB2, or other borides, and the metal binder consists essentially of Al, Ni, Si, B, or alloys thereof.

In some aspects, a downhole cutting tool includes a tool body having a cutting element or cutting element pocket. At least a portion of the tool body includes a metal matrix composite formed from hard particles dispersed in a continuous metal matrix formed from a metal binder. A density ratio of the metallic hard particles to the metal binder is between 0.5 and 1.2, and the metallic hard particles make up less than 60 vol % of the metal matrix composite. The metallic hard particles have a hardness between 500 and 800 VHN, and a density that is less than 9 g/cm$^3$, while the continuous metal matrix surrounding the metallic hard particles has a hardness that is less than 500 VHN.

In some aspects, downhole cutting tools includes a tool body with a cutting element or cutting element pocket thereon. At least a portion of the tool body or an attachment thereto is a metal matrix composite formed from metal carbide particles dispersed in a continuous metal matrix, and the metal carbide particles make up less than 45 wt % of the metal matrix composite.

In some aspects, a downhole cutting tool includes a tool body with a cutting element or cutting element pocket thereon. At least a portion of the tool body or an attachment thereto is a metal matrix composite formed from metal carbide particles dispersed in a continuous metal matrix, and the metal carbide particles make up less than 30 vol % of the metal matrix composite.

In some aspects, a downhole cutting tool includes a tool body with a cutting element or cutting element pocket thereon. At least a portion of the tool body or an attachment thereto is a metal matrix composite formed from metal carbide particles dispersed in a continuous metal matrix, and the metal carbide particles make up less than 45 vol % of the metal matrix composite, while the continuous metal matrix is formed from a metal or metal alloy other than Ni—Si—B.

Other aspects and features of the claimed subject matter will be apparent from the following description and the appended claims.

BRIEF DESCRIPTION OF DRAWINGS

FIG. 1-2 is an exploded view of a drill bit of the downhole tool of FIG. 1-1, according to one or more embodiments of the present disclosure.

FIG. 2 is a side view of another example downhole tool, according to one or more embodiments of the present disclosure.

DETAILED DESCRIPTION

Figure 1:
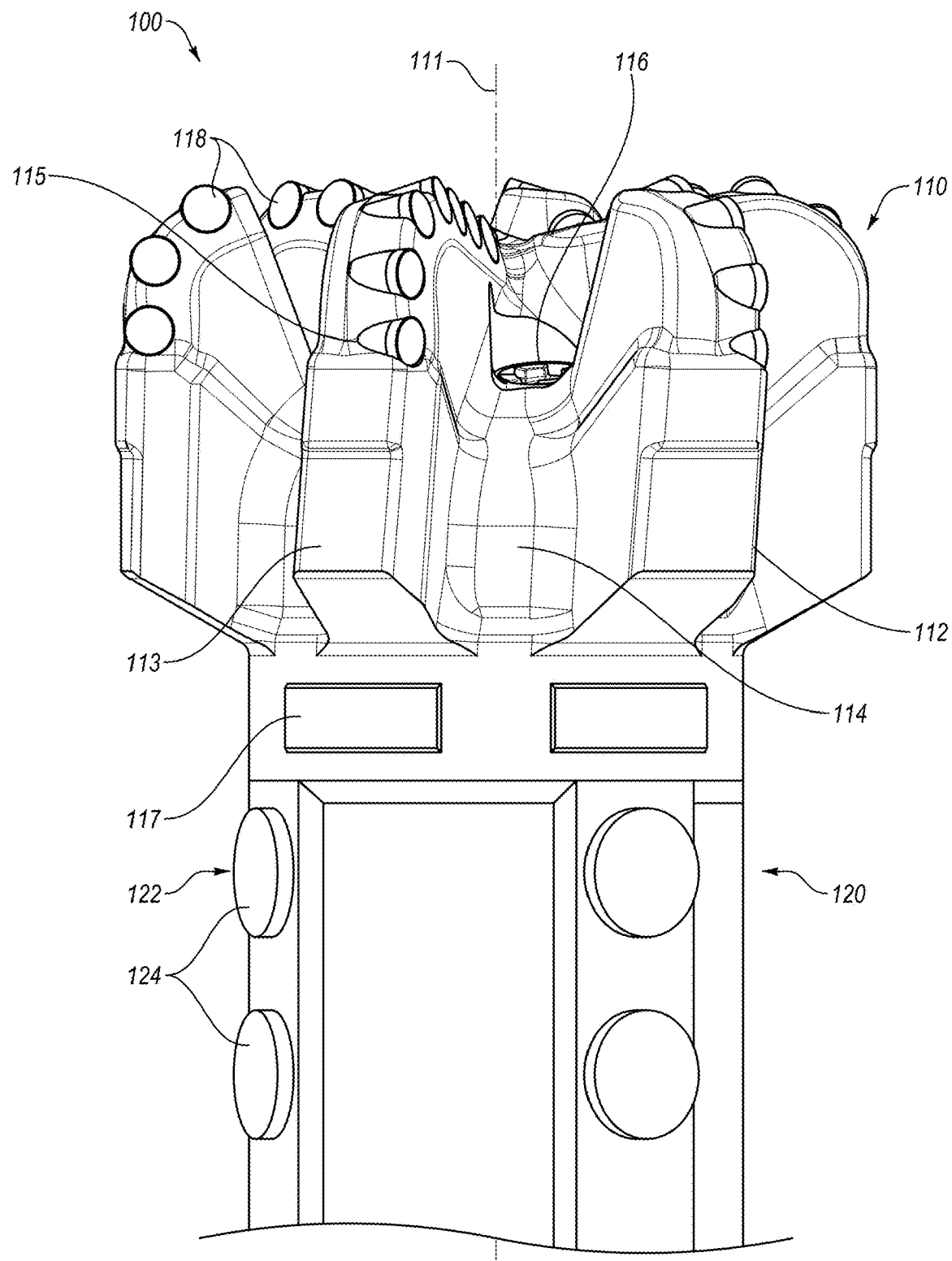
FIG. 1-1 is a side view of an example downhole tool, according to one or more embodiments of the present disclosure.

In some aspects, embodiments disclosed herein relate to downhole cutting tools formed from a metal matrix composite (MMC). Specifically, some embodiments disclosed herein relate to metal matrix composites that may be formed, for example, by additive manufacturing, infiltration/casting, powder bed fusion (PBF), direct metal laser sintering (DMLS), laser deposition, or cladding.

Generally, metal matrix composites (MMC) are composite materials formed of two or more constituents, where at least one of the constituents is a metal, and one or more other constituents may be metals or non-metals, including ceramics or organic compounds. Such other constituents may include a reinforcing material that is dispersed and embedded into a continuous metal matrix.

In accordance with one or more embodiments of the present disclosure, the reinforcing material is a metal carbide or metal boride, such as a tungsten carbide, titanium carbide, niobium carbide, silicon carbide, tungsten di-boride, or titanium diboride, other metal carbides, oxides, borides, and the like. The reinforcing material can be used to provide, for example, wear and erosion resistance to the continuous metal matrix. Tungsten carbide may be selected from cast tungsten carbide (including spherical or angular particles), macrocrystalline tungsten carbide, carburized tungsten carbide, sintered tungsten carbide pellets, or combinations of the foregoing.

In particular, while attempts to improve the wear properties of matrix bit bodies have used wide particle size distributions to increase the packing efficiency of the wear resistant carbide particles, by filling smaller carbide particles into the spaces between larger carbide particles resulting in greater carbide-carbide particle contact, some embodiments of the present disclosure are instead directed to techniques for balancing toughness and wear resistance by using lower carbide or other hard metal contents. Such lower carbide, boride, or other hard metal contents result in greater and more uniform spacing between particles, more even distribution of carbide particles throughout the metal matrix phase, and less carbide-carbide particle contact. As used herein, the term "even" distribution simply means that the carbide particles are more uniformly distributed throughout the binder phase when compared with similar prior art samples.

Properties of hard particles and the metal binder used in the bit body, and which are useful in designing a MMC of the present disclosure, include density, hardness, and modulus of elasticity. The weight fraction and volume fraction of hard particles in the metal matrix composite depends on the relative density of the hard particles and the metal binders. Some typical properties of various hard particles and binder materials are shown in Tables 1 and 2. It should be noted that the values may vary depending on the reference used, and the intent of these tables is primarily to show relative differences rather than specific values.

TABLE 1

| Hard Particles | Density (g/cm$^3$) | Hardness | Modulus of Elasticity GPA | Melting Temperature (° C.) |
|---|---|---|---|---|
| Cast WC/W$_2$C | 16.5 | 2500-3000 VHN | 668-714 | 2700-2880 |
| Carburized WC | 15.6 | 2600 VHN | 600-686 | 2870 |
| MCWC | 15.6 | 2600 VHN | 600-686 | 2870 |
| Sintered WC-Co | 14.33 | 700-2200 VHN | 450-675 | 1280* |
| TiC | 4.93 | 3200 VHN | 448-451 | 3800 |
| NbC | 7.82 | 26 GPa | 438-492 | 3608 |
| SiC | 3.21 | 2800 VHN | 401 | 2830 |
| WB$_2$ | 7.7 | 20 GPa | | |
| TiB$_2$ | 4.52 | 30 GPa | 510-575 | 3230 |
| Fe—Ni—Co alloy | 8.1 | <400 VHN | 150-200 | |

*Eutectic temperature of WC-Co listed as melting point for sintered WC

TABLE 2

| Binder | Density (g/cm$^3$) | Hardness (VHN) | Modulus of Elasticity (GPA) | Melting Temperature (° C.) |
|---|---|---|---|---|
| Ni—B—Si alloy | 8.1 | <400 | 170-240 | 950-1150 |
| Ni alloy | 8.1 | <400 | 170-240 | 1150-1450 |
| Co alloy | 8.1 | <400 | 170-240 | 1150-1450 |
| Fe alloy | 8.1 | <400 | 170-240 | 1150-1450 |
| Al | 3.95 | <300 | 69 | 660 |
| Al—Si alloy | 3.95 | <400 | 74 | 577 |
| Titanium | 4.2 | 200 | 116 | 1720 |
| Co—Ti—Al alloy | 8.5 | <400 | 170-240 | 1450 |

As indicated above, there are several types of tungsten carbide that may be used in forming matrix bodies. Examples include macrocrystalline tungsten carbide, cast tungsten carbide, carburized (or agglomerated) tungsten carbide, sintered tungsten carbide, and cemented tungsten carbide. Macrocrystalline tungsten carbide (or MCWC) is essentially stoichiometric tungsten carbide which is, for the most part, in the form of single crystals; however, some large crystals of macro-crystalline tungsten carbide are bi-crystals. MCWC is achieved by a thermite reaction. Carburized tungsten carbide refers to tungsten carbide achieved through carburization, and has a multi-crystalline structure composed of tungsten carbide agglomerates. An example of carburized tungsten carbide can be referred to as WC, C=6.35% on account of the presence of stoichiometric carbon, resulting in carbon atoms making up between 6.30 and 6.35 wt % of the material, although other carburized tungsten carbide may have other proportions.

Another type of tungsten carbide, which has been used in hardfacing, is cemented tungsten carbide, also known as cobalt sintered tungsten carbide. Example cobalt sintered tungsten carbide materials may be referred to as WC-12Co (has 12 wt % cobalt) or WC-6Co (has 6 wt % cobalt). Sintered tungsten carbide may include small particles of tungsten carbide (e.g., 1 to 5 microns) bonded together with cobalt. Sintered tungsten carbide can be made by mixing organic wax, tungsten carbide and cobalt powders, pressing the mixed powders to form a green pellet by granulation, and "sintering" the composite at temperatures near the melting point of cobalt eutectic (e.g., between 1,150° C. and 1,300° C.). Sintered pellets are generally spherical particles; however, they are often crushed and comminuted to form particles of sintered tungsten carbide for use in hardfacing. In at least some cases, the process used to produce sintered or cemented tungsten carbide uses carburized tungsten carbide materials.

Cast tungsten carbide, on the other hand, can be formed by melting tungsten metal (W) and tungsten monocarbide (WC) together such that a eutectic composition of tungsten carbide and bitungsten carbide (W$_2$C), or a continuous range of compositions there between, is formed. Cast tungsten carbide typically is frozen from the molten state and reduced to a desired particle size. These particles are generally angular in shape. Cast carbide particles can be obtained by atomization of molten cast carbide by gas atomization process, resulting in particles with a spherical shape.

Table 3 below, presents various combinations of hard particle and binder materials, that are contemplated as being within the scope of the present disclosure. The volume percentage is calculated based on an assumption that the material has a mass of 100 g. In Table 3, materials 1 and 2 are examples of baseline materials for comparison purposes. In general, the cast tungsten carbide (WC/W$_2$C) of the examples in Table 3 can have a spherical shape, although angular or eccentric shapes may be used, particularly if such particles are oriented during manufacturing, including within additive manufacturing processes discussed herein.

TABLE 3

| # | Hard Particles HP) | Binder (B) | HP Density (g/cm$^3$) | B Density (g/cm$^3$) | HP/B Density Ratio | HP wt % | B wt % | HP Vol (cm$^3$) | B Vol (cm$^3$) | HP vol % | B vol % |
|---|---|---|---|---|---|---|---|---|---|---|---|
| 1 | WC/W$_2$C | Ni—B—Si, Ni alloys | 16.5 | 8.1 | 2.0 | 72% | 28% | 4.4 | 3.5 | 56% | 44% |
| 2 | | | | | | 45% | 55% | 2.8 | 6.9 | 29% | 71% |
| 3 | | | | | | 30% | 70% | 1.8 | 8.6 | 17% | 83% |
| 4 | | | | | | 35% | 70% | 2.1 | 8.0 | 21% | 79% |
| 5 | | | | | | 40% | 60% | 2.4 | 7.4 | 24% | 76% |
| 6 | Carburized WC | Ni—B—Si, Ni alloys | 15.6 | 8.1 | 1.9 | 30% | 70% | 1.9 | 8.6 | 18% | 82% |

TABLE 3-continued

| # | Hard Particles (HP) | Binder (B) | HP Density (g/cm$^3$) | B Density (g/cm$^3$) | HP/B Density Ratio | HP wt % | B wt % | HP Vol (cm$^3$) | B Vol (cm$^3$) | HP vol % | B vol % |
|---|---|---|---|---|---|---|---|---|---|---|---|
| 7 | | | | | | 35% | 65% | 2.2 | 8.0 | 22% | 78% |
| 8 | | | | | | 40% | 60% | 2.6 | 7.4 | 26% | 74% |
| 9 | | | | | | 45% | 55% | 2.9 | 6.8 | 30% | 70% |
| 10 | MCWC | Ni, Co, Fe alloys | 15.6 | 8.1 | 1.9 | 30% | 70% | 1.9 | 8.6 | 18% | 82% |
| 11 | | | | | | 35% | 65% | 2.2 | 8.0 | 22% | 78% |
| 12 | | | | | | 40% | 60% | 2.6 | 7.4 | 26% | 74% |
| 13 | | | | | | 45% | 55% | 2.9 | 6.8 | 30% | 70% |
| 14 | | | | | | 60% | 40% | 3.8 | 4.9 | 44% | 56% |
| 15 | WC—12Co | Ni—B—Si, Ni alloys | 14.3 | 8.1 | 1.8 | 30% | 70% | 2.1 | 8.6 | 20% | 80% |
| 16 | | | | | | 35% | 65% | 2.4 | 8.0 | 23% | 77% |
| 17 | | | | | | 40% | 60% | 2.8 | 7.4 | 27% | 73% |
| 18 | | | | | | 50% | 50% | 3.5 | 6.2 | 36% | 64% |
| 19 | | | | | | 60% | 40% | 4.2 | 4.9 | 46% | 54% |
| 20 | TiC | Ni—B—Si, Ni alloys | 4.9 | 8.1 | 0.6 | 30% | 70% | 6.1 | 8.6 | 41% | 59% |
| 21 | | | | | | 35% | 65% | 7.1 | 8.0 | 47% | 53% |
| 22 | | | | | | 40% | 60% | 8.1 | 7.4 | 52% | 48% |
| 23 | | | | | | 50% | 50% | 10.1 | 6.2 | 62% | 38% |
| 24 | | | | | | 60% | 40% | 12.2 | 4.9 | 71% | 29% |
| 25 | NbC | Ni—B—Si, Ni alloys | 7.8 | 8.1 | 1.0 | 30% | 70% | 3.8 | 8.6 | 31% | 69% |
| 26 | | | | | | 35% | 65% | 4.5 | 8.0 | 36% | 64% |
| 27 | | | | | | 40% | 60% | 5.1 | 7.4 | 41% | 59% |
| 28 | | | | | | 50% | 50% | 6.4 | 6.2 | 51% | 49% |
| 29 | | | | | | 60% | 40% | 7.7 | 4.9 | 61% | 39% |
| 30 | SiC | Al, Al—Si alloys | 3.2 | 4.0 | 0.8 | 30% | 70% | 9.4 | 17.5 | 35% | 65% |
| 31 | | | | | | 35% | 65% | 10.9 | 16.3 | 40% | 60% |
| 32 | | | | | | 40% | 60% | 12.5 | 15.2 | 45% | 55% |
| 33 | | | | | | 50% | 50% | 15.6 | 12.7 | 55% | 45% |
| 34 | | | | | | 60% | 40% | 18.7 | 10.1 | 65% | 35% |
| 35 | Fe—Ni—Co alloy | Fe, Ni, Co alloys | 8.1 | 8.1 | 1.0 | 0% | 100% | — | 12.3 | 0% | 100% |
| 36 | WB$_2$ | Co—Ti—Al alloys | 7.7 | 8.5 | 0.9 | 40% | 60% | 5.2 | 7.1 | 42% | 58% |
| 37 | | | | | | 50% | 50% | 6.5 | 5.9 | 52% | 48% |
| 38 | | | | | | 60% | 40% | 7.8 | 4.7 | 62% | 38% |
| 39 | TiB$_2$ | Co—Ti—Al alloys | 4.5 | 8.5 | 0.5 | 40% | 60% | 8.9 | 7.1 | 56% | 44% |
| 40 | | | | | | 50% | 50% | 11.1 | 5.9 | 65% | 35% |
| 41 | | | | | | 60% | 40% | 13.3 | 4.7 | 74% | 26% |

In a conventional matrix bit formed by infiltrating packed cast tungsten carbide with a nickel-based binder, the density ratio of the hard particles to metal binder is around 2.0, and at least 50-70 volume percent (vol %) of the bit matrix is formed of hard carbide particles, which can be at least 60-80 weight percent (wt %) from the hard carbide particles. In some embodiments, however, the present disclosure contemplates materials that include up to 25 vol %, up to 27 vol %, or up to 28 vol % hard particles in the metal matrix composite. In terms of weight percent, in one or more embodiments, it is envisioned that the hard particles used in forming the metal matrix composite may compose up to up to 30 wt %, up to 35 wt %, or up to 42 wt % of the metal matrix composite. In at least some embodiments, the balance may be primarily or entirely formed by the binder metal forming the continuous metal matrix, and at the same time, the density ratio of the hard particles may be between 0.6 and 2.1. For instance, in Table 3, materials 5 and 17 each have up to 28 vol % and/or up to 43 wt % hard particles formed of either cast tungsten carbide or sintered tungsten carbide, with a balance primarily made up of nickel-boron-silicon or nickel alloy binder (e.g., at least 70 vol % or at least 55 wt % binder), while having a hard particle to binder density ratio between 1.7 and 2.1, or between 1.8 and 2.0.

Despite the low carbide content in these examples, the metal matrix composites of some of the materials of the present disclosure, including materials in Table 3, have an erosion rate that is less than 0.1 g/lb sand (0.22 g/kg sand), less than 0.09 g/lb sand (0.20 g/kg sand), or less than 0.08 g/lb sand (0.18 g/kg sand) in one or more embodiments. Such erosion rates may be determined using a modified ASTM G76 test, in which water (instead of air) is used for the fluid. Sand particles are 50/70 mesh Ottawa sand, with test times of 6 to 12 minutes. The angle of the nozzle jet (with respect to the sample) is 150°. The distance between the nozzle exit and the coupon is 2 in. (5.08 cm). The jet velocity is approximately 200 ft/s (61 m/s), and the sand consumption is approximately 0.75 lb/min (0.34 kg/min). The value is normalized by the weight of sand used.

Further, despite lower hard particle content and while possessing good erosion resistance, the metal matrix composites of the present disclosure may also possess good transverse rupture strength, ductility, and fracture toughness. For example, in one or more embodiments, the transverse rupture strength is greater than 150 ksi (1030 MPa), and the fracture toughness is greater than 22 ksi*in$^{0.5}$. (24 MPa*m$^{0.5}$) Transverse rupture strength may be measured according to ASTMB406, and fracture toughness may be measured according to modified ASTME399 (X. Deng, et al., Toughness Measurement of Cemented Carbide with Chevron-Notched Three-Point Bend Test," Advanced Engineering Materials, 2010, 12(9), pp. 948-952). Further, in one or more embodiments, the metal matrix composite has a porosity of less than 1% and a ductility that ranges between 0.2% and 5%.

As mentioned herein, one or more embodiments of the present disclosure may use cast tungsten carbide in the metal matrix composite. Cast tungsten carbide may have approximately the eutectic composition between bitungsten carbide, $W_2C$, and monotungsten carbide, WC. Cast tungsten carbide can be made by resistance heating tungsten in contact with carbon. Available types of cast tungsten carbide include crushed cast tungsten carbide and spherical cast tungsten carbide. Processes for producing spherical cast carbide particles are described in U.S. Pat. Nos. 4,723,996 and 5,089,182, which are herein incorporated by reference. Briefly, tungsten may be heated in a graphite crucible having a hole through which a resultant eutectic mixture of $W_2C$ and WC may drip. This liquid may be quenched in a bath of oil and may be subsequently comminuted or crushed to a desired particle size to form what is referred to as crushed cast tungsten carbide. In other processes, a mixture of tungsten and carbon is heated above its melting point into a constantly flowing stream which is poured onto a rotating cooling surface, typically a water-cooled casting cone, pipe, or concave turntable. The molten stream is rapidly cooled on the rotating surface and forms spherical particles of eutectic tungsten carbide, which are referred to as spherical cast tungsten carbide.

A eutectic mixture of WC and $W_2C$ may include about 4.5 wt % carbon. Cast tungsten carbide used as a matrix powder may have a hypoeutectic carbon content of about 4 wt %. Thus, by way of example only, the cast tungsten carbide used in the mixture of tungsten carbides may be comprised of from 3.7 to 4.2 wt % carbon.

It is also envisioned that while one or more embodiments may have carbide particles that include or consist of cast tungsten carbide (spherical in particular, example embodiments), other embodiments may instead or also use other types of tungsten carbide, including, for example, macrocrystalline tungsten carbide, carburized tungsten carbide, or sintered tungsten carbide, cemented tungsten carbide, alone or in combination with each other and/or cast tungsten carbide. Various types of tungsten carbide materials described herein may be selected so as to provide a bit that is tailored for a particular drilling application. For example, the type (e.g., cast, cemented, sintered, or macrocrystalline tungsten carbide), shape, and/or size of carbide particles used in the formation of a metal matrix composite may affect the material properties of the formed body, including, for example, fracture toughness, transverse rupture strength, and wear and erosion resistance.

A continuous metal matrix of the metal matrix composite may be formed from a metal binder material. Suitable metals include any transition metals, main group metals, and alloys thereof. For example, nickel, iron, cobalt, titanium, or copper may be used as the major constituents. Other elements, such as aluminum, manganese, chromium, zinc, tin, silicon, silver, boron, tungsten, carbon, titanium, molybdenum, phosphorous, niobium, titanium, or lead, may also be present. For example, in one or more embodiments, the binder may be formed from a transition metal or transition metal alloy, such as a Group VII metal (i.e., nickel, iron, cobalt) or alloys thereof, such as Ni—Si—B alloy, Co—Cr alloy, or Ni—Cr alloy. In another example, the binder may be formed from a Group IB elements or alloys, such as Ag— or Cu-based alloys.

Further, it is also envisioned, in one or more embodiments, that a nickel metal or alloy is used that does not include one or more of silicon or boron, and/or that includes at least one alloying element other than silicon or boron to reduce the melting temperature of the binder and reduce dissolution of the carbide particles therein during melting of the binder. In some embodiments, instance, B, Si—Mn, or Mn may be added to reduce the melting temperature of the binder. In some examples, Si may be added to increase fluidity, Al may be used as a de-oxidizer, Cr or Fe may be included to provide increased strength, or Cr may be used to reduce corrosion and form borides. Combinations of one or more of B, Mn, Al, Cr, Fe, or other materials may also be included in the binder to reduce the melting temperature, increase fluidity, and the like.

In some examples, Ni-based binders do not include one or more of silicon or boron, or in non-Ni binders, it may be desirable to form a MMC having a carbide content of less than 40 wt %. Further, when using a Ni—Si—B binder, in particular, the amount of carbide may be lower, such as less than 30 wt %. In another example, between 10 and 40 wt % hard particles may be added to a Ni—Cr superalloy, such as an INCONEL® alloy available from Special Metals Company.

In another embodiment of the present disclosure, it is contemplated that a MMC includes a body at least partially formed of a metal matrix composite that is less than 55 vol % hard particles, while the density ratio of the hard particles to the metal binder is between 0.9 and 1.1. In these cases, the density of the hard particles is similar to that of binder material. When a mixture of the metal binder and hard particles is created, the similar densities may allow the mixture to have improved flow, such as when flowing through a feed system of an additive manufacturing system. Examples of such materials include materials 27, 28, and 37 from Table 3. Such materials may include hard materials that include transition metal carbides or borides, including NbC and $WB_2$ used in combination with transition metal binders or transition metal alloy binders. Example binder materials are optionally selected from Group VIII (e.g., Ni, Fe, Co) or are alloys of Grip VIII materials (e.g., Ni—B—Si or Co—Ti—Al). As merely an example, a suitable binder material may be formed of 3 wt % titanium, 5 wt % aluminum, with the balance being primarily cobalt. Another suitable binder material may include a titanium-aluminum-vanadium alloy, such as a binder with 6 wt % aluminum, 4 wt % vanadium, and the balance being primarily titanium.

In still another embodiment of the present disclosure, it is further contemplated that a MMC may include a body fully or partially formed of a metal matrix that is less than 60 vol % hard particles, while the density ratio of hard materials to binder material is between 0.5 and 1.2. Some examples of such materials are materials 22, 27, 28, 32, 33, and 37 from Table 3. Such materials may include hard materials that include transition metal carbides or borides, including TiC, NbC, $Nb_2C$, $NbB_2$, $WB_2$, $W_2B$, $WB_4$, $TiB_2$, or $TiB_4$ used in combination with transition metal binders or transition metal alloy binders. Example binder materials are optionally selected from Group VIII (e.g., Ni, Fe, Co) or are alloys of Grip VIII materials (e.g., Ni—B—Si or Co—Ti—Al). In some embodiments, the MMC may include a body fully or partially formed of a metal matrix that is less than 55 vol % hard particles while having a density ratio of hard materials to binder material that is between 0.5 and 1.2.

It is also envisioned that while one or more embodiments of a MMC may have carbide or boron particles that include or consist of hard particles such as NbC, $Nb_2C$, $NbB_2$, SiC, $SiB_n$, TiC, $TiB_2$, $TiB_4$, $WB_2$, $WB_4$, or the like, while the density ratio of hard particles to binder materials is between 0.3 and 1.2, between 0.5 and 1.1, between 0.6 and 1.1, between 0.8 and 1.1, between 0.8 and 1.05, or between 0.85 and 1.15. In at least some such embodiments, the hard particles may compose up to 42 wt % of the matrix material, as illustrated by materials 22, 27, and 32 of Table 3. The continuous metal matrix may be composed of a binder material that makes up a substantial portion of the balance, such that at least 55 wt % or at least 60 wt % of the matrix material is composed of the binder material. The binder may include transition metal binders or transition metal alloy binders. Example binder materials are optionally selected from Group VIII (e.g., Ni, Fe, Co) or are alloys of Group VIII materials (e.g., Ni—B—Si or Co—Ti—Al). In some examples, the binder materials may include titanium or titanium alloys. In some embodiments, hard particles (e.g., carbide or boride particles) may be present in particle sizes ranging from 20 to 150 microns in diameter.

Further, one skilled in the art would appreciate in view of the present disclosure that wear properties may be affected by selection of the particle or mesh size, and also by selection of hard particle type. For example, the wear resistance will generally increase as the grain size of a hard particle such as tungsten carbide decreases. Conversely, toughness will increase as grain size increases. Moreover, among the types of tungsten carbide, some types will be more wear resistant than others, while the others may have greater contribution to toughness. For instance, in comparison to other types of tungsten carbide, MCWC and carburized tungsten carbide may have relatively higher wear resistance and hardness, while cast carbide may have relatively high toughness and wear resistance. Cemented, sintered tungsten carbide may in turn have relatively high toughness, but lower relative wear resistance. These relationships are also mirrored in other hard particles and not limited to tungsten carbide.

The metal matrix composite of the present disclosure may be formed by one of several methods, including additive manufacturing. Example additive manufacturing processes include, but are not limited to, powder bed fusion, binder jetting, infiltration/casting, laser deposition, or cladding. Powder bed fusion techniques may include, for example, high energy fusion techniques that include direct metal laser sintering (DMLS), electron beam melting (EBM), selective heat sintering (SHS), selective laser melting (SLM), and selective laser sintering (SLS). In one or more particular embodiments, the metal matrix composite may be formed layer-by-layer using EBM where sequential layers of a mixture of hard material and binder power are deposited and the metal phase, or binder, is sintered or otherwise melted to form a dense, solid composite. Depending on the method selected, the binder may be selected accordingly, to have the appropriate melting point for the particular method (or vice versa). For example, in one or more embodiments, the binder may have a melting point including a lower limit, an upper limit, or upper and lower limits including any of 600° C., 700° C., 800° C., 1,000° C., 1,100° C., 1,200° C., 1500° C., or any values therebetween.

Accordingly, in addition to conventional method of making steel body (machining) or metal matrix composite (infiltration in a mold) one can also utilize additive manufacturing for making a bit body or a portion of a bit body. According to the present disclosure, using the various methods of manufacturing such as DMLS, EBM, SHS, SLM, LSL, and the like, one can engineer different compositions using various additive manufacturing process. The relative quantities of hard particles and binder materials can be changed based on property requirements. Accordingly, one can have 100% metal binder, or a mixture of hard particles distributed in a metal binder matrix ranging from 10 wt % to 90 wt %, irrespective of particle size of the hard particles.

In at least some embodiments, materials of the present disclosure may be used to produce a drill bit or other cutting tool or downhole tool in a manner that either cannot be formed using other techniques such as infiltration, or which would result in a product with properties that are physically very different. For instance, when small particle sizes are used in a high energy fusion manufacturing technique, a vacuum environment may be used. Without a vacuum environment, small particle sizes may not be suitably infiltrated, as the capillary connection isn't strong, and voids aren't connected, thereby leading to limited flow of binder materials. Additionally, at elevated temperatures used in high energy fusion techniques, carbide or other hard particles may be damaged. For instance, particularly for cast carbide and nickel, iron, or cobalt binder, infiltration at temperatures similar to those used in high energy fusion techniques may create an Eta phase in the carbide, resulting in a drop in transverse rupture strength and toughness, and increased brittleness of the material. Further still, high energy fusion techniques may be used to deposit and fuse hard particles and binder materials in layers that can have a relatively consistent hard particle weight and volume percentage. In contrast, and particularly for compositions having relatively lower hard particle volume percentages (e.g., materials 5, 13, 14, 17-19, 22, 23, 27, 28, 32, 33, 37, and 40 of Table 3), infiltration techniques would result in settling of the hard particles toward the bottom of a mold, resulting in a bit having a dramatic gradient in the hard particle weight and volume percentages, and thus having significantly less hard particle volume and mass at the top of the molded part. As a result, a component formed of relatively low hard particle volumes have significantly different physical properties when produced layer-by-layer using a high energy fusion technique, than when produced using an infiltration or molding procedure.

According to the present disclosure, a metal matrix composite produced by additive manufacturing optionally uses spherically shaped particles. The reason for this to ensure good flowability and packing. With some direct sintering processes using laser or electron beam, however, the use of near spherical particles is envisioned, where the ratio of the equivalent diameter measured at a perpendicular position is between 0.7 and 1.0. The particles used could be individual hard particles or a blend of hard particles with the binder metal. If the densities of the hard particles and metal binder are significantly different, it is contemplated that the hard particles and metal alloy particles have similar weight. In such cases two different sizes of particles may be used—one for hard particles and the other for binder particles. It is also possible that the particle sizes for hard materials and binder materials may be different based on the thermal diffusivity values for a given direct energy sintering or melting process.

The preferred particle sizes used in some electron beam and laser direct sintering/melting methods may be quite different. Table 4 includes the preferred particle sizes for powder bed fusion techniques, and includes examples taken from the "Powders for Additive Manufacturing Processes: Characterization Techniques and Effects on Part Properties" article by A. Sutton et al. and published in Solid Freeform Fabrication 2016, pp. 1004-1030, which article is incorporated herein by this reference in its entirety.

TABLE 4

| Technique | Lower Particle Size Limit | Upper Particle Size Limit |
| --- | --- | --- |
| Electron Beam Melting | 45 μm (325 mesh) | 106 μm (140 mesh) |
| Laser Melting | 15 μm (635 mesh*) | 80 μm (200 mesh**) |

*Standard mesh stops at 635 mesh (20 μm)
**200 mesh represents 74 μm

A MMC may be used to form one or more downhole tools or components for downhole tools, including but not limited to drill bits, reamer cutter blocks, stabilizer pads, pads for steering tools, other wear or gage pads, section mill blades, casing mill blades, or the like. For example, referring now to FIGS. 1-1 and 1-2, an illustration of a cutting tool according to one or more embodiments is shown. As shown, the cutting tool includes a bit 100 having a bit body 110 with a plurality of blades 112 that extend along the surface of the bit body 110. At least some of the blades 112 may extend from a position proximate a central longitudinal axis 111 of the bit body 110, and radially outwardly to the outer diameter of the bit body 110. One or more blades 112 may further extend axially to define the diameter (or gage) of the bit 100. Blades 112 may include or terminate at gage pads 113. A plurality of cutting elements 118 may be received by cutter pockets 115 formed in blades 112. The blades 112 are separated by exterior hydraulic fluid flow passages (i.e., junk slots) 114 that enable drilling fluid to flow from nozzles or ports 116 to clean and cool the blades 112 and cutting elements 118. A stabilizer pad 117 is optionally located on a blade 112 or at other locations other than a blade 112, such as on the bit body 110.

In FIG. 1-1, the bit 100 is coupled to a rotary steerable system ("RSS") 120 that may be used to steer the bit 100 when forming or enlarging a wellbore. The RSS 120 may include one or more steering devices 122 that are selectively actuatable to steer the bit 100. In some embodiments, the steering device 122 may include one or more pistons or pads 124 that are actuatable to move in a radially outward direction relative to a longitudinal axis 111 of the bit 100 and RSS 120. The RSS 120 may apply a force at an angle relative to the drilling direction of the bit 100 to deflect the drilling direction. For instance, the pistons/pads 124 may apply a force at an angle that is about perpendicular to the longitudinal axis 111, or that is within 5°, 15°, or 30° of being perpendicular to the longitudinal axis 111. In some embodiments, the steering device 122 may be or include an actuatable surface or ramp that moves in a radial direction relative to the longitudinal axis 111. The bit 100 and RSS 120 may rotate about the longitudinal axis 111, and the one or more steering devices 122 may actuate in a timed manner with the rotation to steer the bit and form a directional wellbore, or to maintain a straight wellbore.

In accordance with one or more embodiments of the present disclosure, the entire bit body 110 (or bit face in particular embodiments), or the entire body of the RSS 120 may be formed from a MMC of the present disclosure. In some embodiments, however, components of the bit body 110 or RSS 120 may be formed of a MMC of the present disclosure. For example, in one or more embodiments, the steering pistons or pads 124 may be formed of the MMC, or the gage pads 113 or stabilizers 117 may be formed of the MMC. In some embodiments, components of bit body or blade—rather than a full bit body or blade—may be formed of the MMC of the present disclosure. For example, in one or more embodiments, one or blades 112 may be formed of the MMC of the present disclosure, while the rest of the bit body 110 may be formed of a different material (e.g., steel or standard matrix materials)

Figures 1, 2:
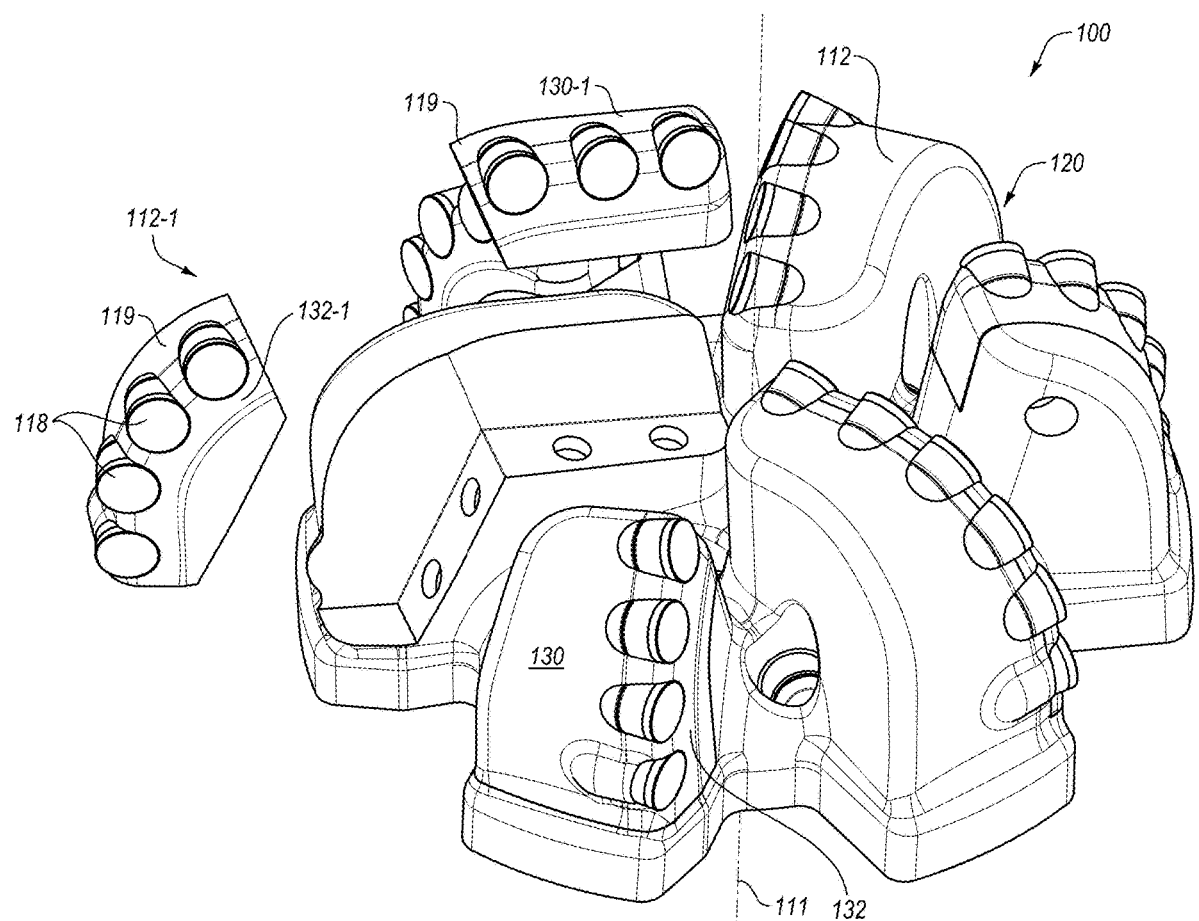
Figure 2:
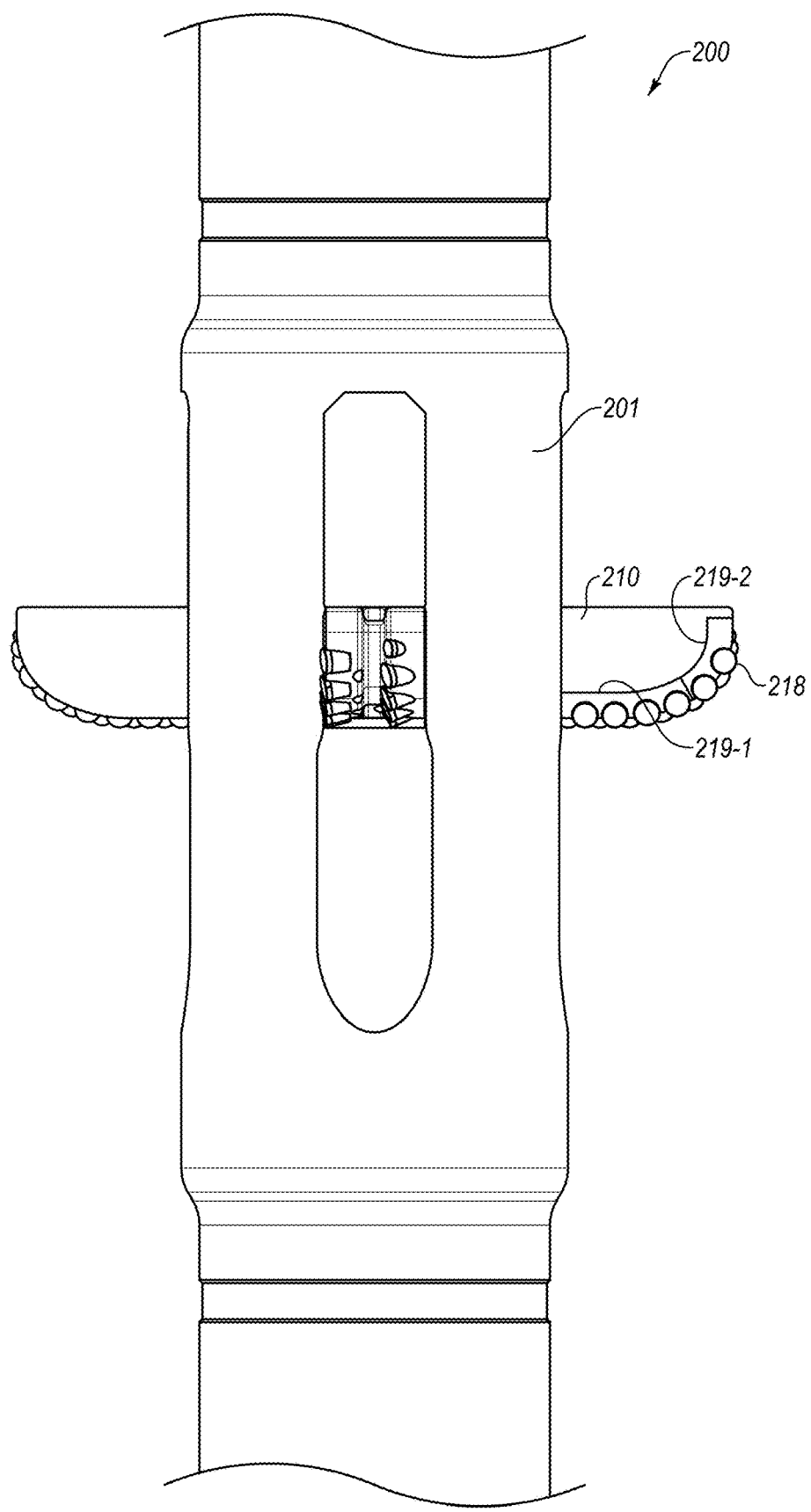

It is also envisioned that a part of a blade 112 may be formed from the MMC of the present disclosure while the remaining portions are formed from a different material. For example, a blade 112 may be formed from, or include, multiple segments, one or more of which includes the MMC of the present disclosure. FIG. 1-2, for instance, illustrates the bit 100, including blades having blade top surfaces 130 (facing the formation) and blade face surfaces 132 (leading in the direction of rotation around the axis 111). One or each of the blades 112 may include at least one segment 119 that is attachable to the blade 112. Specifically, as shown in FIGS. 1-2, which includes an exploded view of blade 112-1, the MMC of the present disclosure may form segments 119 that are attached to the blade to form a portion of the leading blade face surface 132-1 of blade, adjacent the cutting elements 118 (and in fact, defining a portion of the cutter pockets 115 in this embodiment). The segments 119 optionally also form a portion of the blade top surface 130-1 of the blade 112-1. In the illustrated embodiment, the MMC of the present disclosure may be used to form at least a portion of a top surface 130-1 (spanning a portion of the width and depth of the blade 112-1; however, in other embodiments, the MMC may form a portion of only the blade face surface, may extend a full width and/or depth of the blade 112-1, or be otherwise sized, or shaped. As shown in FIGS. 1-2, the segments 119 may each extend a partial length of the blade 112-1; however, in other embodiments, a single segment may extend a full length of the blade 112-1. In this manner, one or more segments may be used on a drill bit (formed from the MMC of the present disclosure) that has the material properties described herein. For example, the portion of blades that surrounds the cutting elements may be particularly susceptible to erosion, and thus use of the MMC of the present disclosure may have particular benefit in such location(s), while other portions of the bit body may include portions formed of other (e.g., tougher or less brittle) materials. It is understood that when a segment of a bit body or blade is formed from the MMC of the present disclosure, the remaining portions of the bit may be formed from the same or a different MMC, a different matrix material, of steel, or from another material, without departing from the scope of the present disclosure.

As noted above, while the MMC may be used to form all or a portion of the bit body 110, the MMC may be used to form all or portions of other components, including steering pads 124. A MMC according to the present disclosure may also be used in connection with still other tools as well, including reamers or hole openers, mills, and the like. FIG. 2 illustrates another example downhole tool for use with a MMC of the present disclosure, and is illustrative of an expandable or fixed milling tool or underreamer. The downhole tool 200 may be used in milling applications to remove casing from a wellbore or other downhole environment, or in underreaming applications to degrade formation or cement. The downhole tool 200 may have one or more cutting arms, blades, or cutting tool bodies 210 that are formed fully or partially from a MMC of the present disclosure.

In particular, the cutting tool bodies 210 may be selectively deployable at the intended location in the wellbore, or may be fixed in the illustrated, expanded position. The cutting tool bodies 210 (e.g., blades) may be attached to a tool body 201 and in FIG. 2 have a plurality of cutting elements 218 positioned on a radially outward portion of the cutting tool body 210, which portion is configured to remove casing, cement, formation, or the like. For example, a combination of different cutting elements 218 may be used depending on the location on the cutting tool body 210. Although the entire cutting tool body 210 to which the cutting elements 218 are attached may be formed of the MMC, in some examples, a first segment 219-1 may carry and/or protect one or more cutting elements 218, while at least a portion of the body 210 is formed of a different segment that is optionally a different material (e.g., steel or a different matrix material). Optionally, a second segment 219-2 may carry and/or protect one or more other cutting elements 218. In yet other examples, the cutting tool body 210 may have one continuous segment that may carry cutting elements 218. The segments 219-1, 219-2 may be similar to the segments 119 of FIG. 1-2, and may form a portion of the leading face and/or formation-facing face of the cutting tool body 210.

MMC Examples

Example 1

Figure 3:
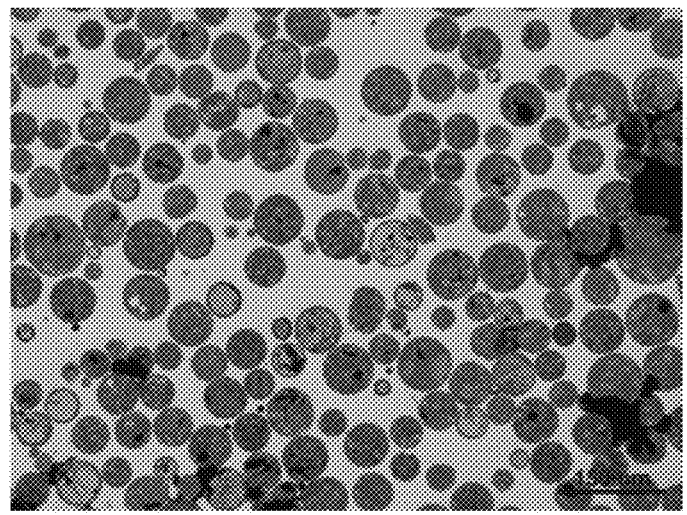
FIG. 3 is an optical micrograph of an example metal matrix composite, according to one or more embodiments of the present disclosure.

A MMC was additive manufactured using electron beam welding with spherical, cast carbide particles of nominal size of 50 μm and a Ni binder. An optical micrograph of the MMC of Example 1 is shown in FIG. 3. The volume fraction of carbide particles in the MMC of Example 1 was measured using a point grid method and had a mean volume fraction of 54 vol %.

Example 2

Figure 4:
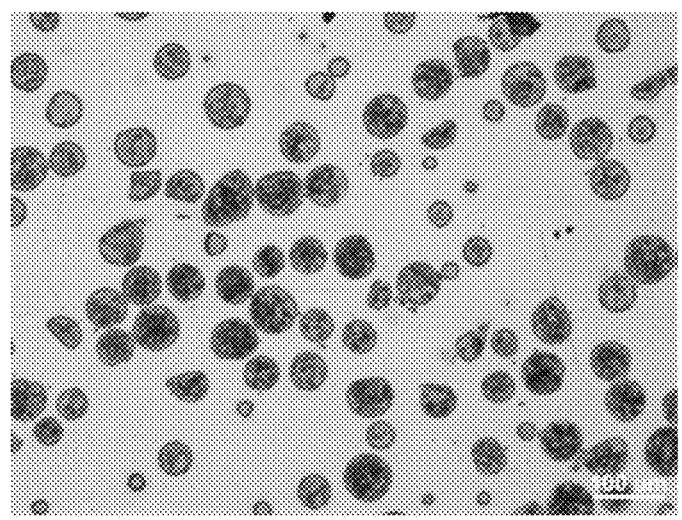
FIG. 4 is an optical micrograph of an example metal matrix composite, according to one or more embodiments of the present disclosure.

A MMC was additive manufactured using electron beam welding with spherical, cast carbide particles of nominal size of 50 μm and a Ni—Cr—Mo binder. An optical micrograph of the MMC of Example 2 is shown in FIG. 4. The volume fraction of carbide particles in the MMC of Example 2 was measured using a point grid method and had a mean volume fraction of 25 vol %.

Example 3

Figure 5:
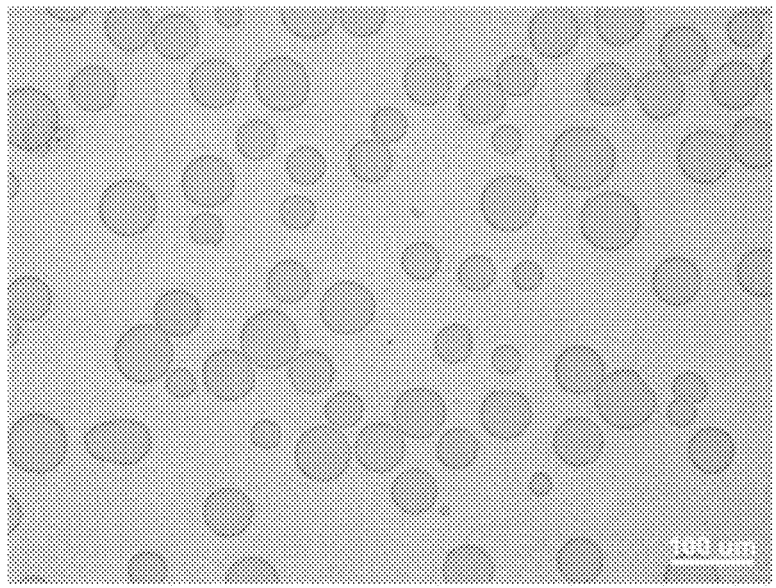
FIG. 5 is an optical micrograph of an example metal matrix composite, according to one or more embodiments of the present disclosure.

A MMC was additive manufactured from spherical, cast carbide particles of nominal size of 50 μm and a Ni—Si—B binder. An optical micrograph of the MMC of Example 3 is shown in FIG. 5. The volume fracture of carbide particles in the MMC of Example 3 was measured using a point grid method and had a mean volume fraction of 26 vol %.

Comparative Example 1

Figure 6:
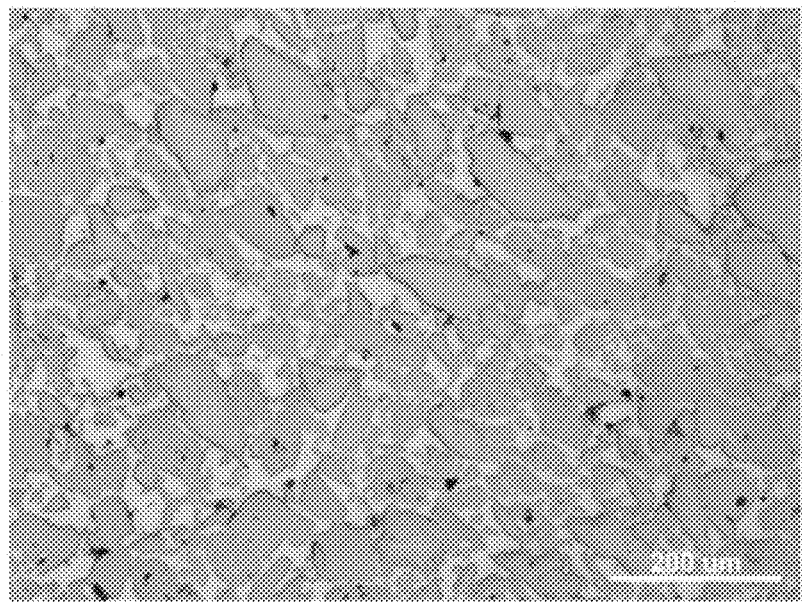
FIG. 6 is an optical micrograph of a comparative metal matrix composite, according to one or more embodiments of the present disclosure.

A mold-infiltrated sample matrix material available from Smith International, Inc. (Houston, Tex.) was produced, and an optical micrograph of such comparative example 1 is shown in FIG. 6. The illustrated matrix material includes a copper-based binder, containing Ni, Mn, and Zn, with the balance being tungsten carbide. The refractory powders used for the matrix material include nickel powder and both stoichiometric and cast tungsten carbide. Powders used for the material include nickel powder and cast tungsten carbide of size −80+120 mesh. The cast tungsten carbide makes up more than 80 wt % of the powder mixture.

Comparative Example 2

Figure 7:
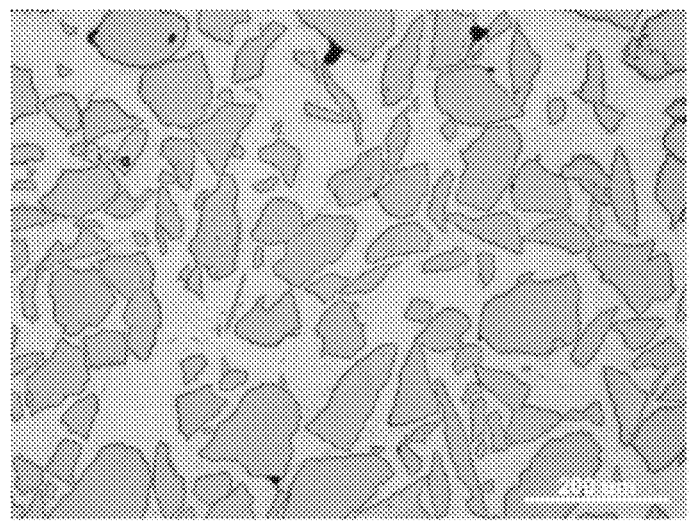
FIG. 7 is an optical micrograph of a comparative metal matrix composite, according to one or more embodiments of the present disclosure.

A mold-infiltrated sample of matrix material available from Smith International, Inc. (Houston, Tex.) was produced, and an optical micrograph of such comparative example 2 is shown in FIG. 7. The illustrated matrix material includes a copper-based binder, containing Ni, Mn, and Zn, with the balance being tungsten carbide. Powders used for the material include nickel powder and cast tungsten carbide of size −80+120 mesh. The cast tungsten carbide makes up more than 80 wt % of the powder mixture.

A comparison of the material properties of each of Example 1-3, as well as Comparative Examples 1 and 2 are shown in Table 5 below. It is noted that the Comparative Example 1 is considered to have good transverse rupture strength (TRS) with less desirable erosion resistance, and the Comparative Example 3 is considered to have good erosion and abrasion resistance with less desirable TRS. Thus, by demonstrating the same or better TRS as the Comparative Example 1 in combination with the same or better erosion resistance as Comparative Example 2, the MMC of Examples 1-3 achieve good results in each of two properties that are generally achieved at the sacrifice of the other, despite having significantly lower hard particle content than Comparative Examples 1 and 2.

TABLE 5

| Material | ASTM B406 TRS Actual (ksi) | Normalized | ASTM B611 ABRASION Actual (krev/cc) | Normalized | Modified ASTM E399 FRACTURE TOUGHNESS Actual (ksi*in$^2$) | Normalized | SLB Erosion −30 deg Actual (g (lost)/lb (sand)) | Normalized |
|---|---|---|---|---|---|---|---|---|
| CE1 | 149 | 100% | 1.05 | 78% | 17.8 | 100% | 0.388 | 369% |
| CE2 | 126 | 85% | 1.34 | 100% | 15.9 | 89% | 0.0827 | 0% |
| Ex. 1 | 298 | 200% | 1.82 | 136% | 26.5 | 149% | 0.0528 | −36% |
| Ex. 2 | 153 | 103% | 2.18 | 163% |  |  | 0.0815 | −1% |
| Ex. 3 | 181 | 121% | 2.02 | 151% | 25.7 | 144% | 0.075 | −9% |

Although a few example embodiments have been specifically described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke means-plus-function or other functional claiming for any limitations of any of the claims herein, except for those in which the claim expressly uses the words 'means for' together with an associated function.

What is claimed is:

1. A downhole cutting tool, comprising:
   a tool body including a cutting element or cutting element pocket thereon, at least a portion of the tool body including a metal matrix composite formed from spherical cast carbide particles dispersed in a continuous metal matrix formed from a metal binder, wherein:
   a density ratio of spherical cast carbide particles to the metal binder is between 1.7 and 2.1;
   the spherical cast carbide particles compose between 30 wt % and 40 wt % of the metal matrix composite;
   a particle size of the spherical cast carbide particles is between 20 and 150 microns; and
   the metal binder makes up at least 75 vol % of the metal matrix composite, wherein the metal matrix composite has a transverse rupture strength greater than 150 ksi and a fracture toughness over 22 ksi*in$^{0.5}$.

2. The downhole cutting tool of claim 1, the metal binder consisting essentially of transition metals or transition metal alloys.

3. The downhole cutting tool of claim 2, the metal binder consisting essentially of iron, nickel, copper, or alloys thereof.

4. The downhole cutting tool of claim 1, the at least a portion of the tool body including an attached tool body segment.

5. The downhole cutting tool of claim 1, the at least a portion of the tool body including the metal matrix composite being formed using a high energy fusion additive manufacturing process.

6. The downhole cutting tool of claim 1, the metal matrix composite having an erosion rate of less than 0.1 g/lb. sand.

7. The downhole cutting tool of claim 1, the metal matrix composite having a transverse rupture strength greater than 180 ksi and a fracture toughness over 25 ksi*in$^{0.5}$.

8. A downhole cutting tool, comprising:
a tool body including a cutting element or cutting element pocket thereon, at least a portion of the tool body including a metal matrix composite formed from hard particles dispersed in a continuous metal matrix formed from a metal binder, wherein:
a density ratio of the hard particles to the metal binder is between 0.5 and 1.2;
a particle size of the hard particles is between 20 to 150 microns; and
the hard particles make up between 26 vol % and 54 vol % of the metal matrix composite, wherein the metal matrix composite has a transverse rupture strength greater than 150 ksi and a fracture toughness over 22 ksi*in$^{0.5}$.

9. The downhole cutting tool of claim 8, the hard particles having a density of less than 5 g/cm$^3$.

10. The downhole cutting tool of claim 9, the metal binder consisting essentially of transition metals or transition metal alloys.

11. The downhole cutting tool of claim 10, the metal binder consisting essentially of iron, nickel, copper, or alloys thereof.

12. The downhole cutting tool of claim 11, the metal binder consisting essentially of copper alloys.

13. The downhole cutting tool of claim 8, the metal binder including titanium, and the density ratio being between 0.85 and 1.15.

14. The downhole cutting tool of claim 8, the at least a portion of the tool body including the metal matrix composite being formed using a high energy fusion additive manufacturing process.

15. A downhole cutting tool, comprising:
a tool body including a cutting element or cutting element pocket thereon, at least a portion of the tool body including a metal matrix composite formed from hard particles dispersed in a continuous metal matrix formed from a metal binder, wherein:
a density ratio of hard particles to the metal binder is between 0.9 and 1.1;
the hard particles make up between 30 wt % and 40 wt % of the metal matrix composite;
a particle size of the hard particles is between 20 to 150 microns;
the hard particles are a transition metal carbide or boride including SiC, TiB$_2$, or other borides; and
the metal binder consists essentially of Al, Ni, Si, Ti, B, or alloys thereof, wherein the metal matrix composite has a transverse rupture strength greater than 150 ksi and a fracture toughness over 22 ksi*in$^{0.5}$.

16. The downhole cutting tool of claim 15, the continuous metal matrix consisting essentially of transition metals or transition metal alloys.

17. The downhole cutting tool of claim 16, the continuous metal matrix consisting essentially of titanium, iron, nickel, copper, or alloys thereof.

18. The downhole tool of claim 15, the continuous metal matrix consisting essentially of iron or nickel base alloys containing an alloying component that reduces the melting temperature of the metal binder.

19. The downhole cutting tool of claim 15, the continuous metal matrix having a melting point below 1,200° C.

20. The downhole cutting tool of claim 15, the at least a portion of the tool body including the metal matrix composite being formed using a high energy fusion additive manufacturing process.

21. A downhole cutting tool, comprising:
a tool body including a cutting element or cutting element pocket thereon, at least a portion of the tool body including a metal matrix composite formed from metallic hard particles dispersed in a continuous metal matrix formed from a metal binder, wherein:
a density ratio of the metallic hard particles to the metal binder is between 0.5 and 1.2;
the metallic hard particles make up between 26 vol % and 54 vol % of the metal matrix composite;
the metallic hard particles have a hardness between 500 and 800 VHN, and a density that is less than 9 g/cm$^3$;
a particle size of the metallic hard particles is 20 and 150 microns; and
the continuous metal matrix surrounding the metallic hard particles has a hardness that is less than 500 VHN, wherein the metal matrix composite has a transverse rupture strength greater than 150 ksi and a fracture toughness over 22 ksi*in$^{0.5}$.

22. The downhole cutting tool of claim 21, the at least a portion of the tool body including the metal matrix composite being formed using a high energy fusion additive manufacturing process.

23. The downhole cutting tool of claim 21, the metallic hard particles having a melting point below 1,700° C.

* * * * *